(12) United States Patent
Brenninger

(10) Patent No.: US 9,157,785 B2
(45) Date of Patent: Oct. 13, 2015

(54) METHOD TO DETERMINE VEHICLE WEIGHT

(75) Inventor: Martin Brenninger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/349,575

(22) PCT Filed: Sep. 13, 2012

(86) PCT No.: PCT/EP2012/067976
§ 371 (c)(1),
(2), (4) Date: Apr. 3, 2014

(87) PCT Pub. No.: WO2013/053564
PCT Pub. Date: Apr. 18, 2013

(65) Prior Publication Data
US 2014/0278041 A1     Sep. 18, 2014

(30) Foreign Application Priority Data
Oct. 13, 2011 (GB) .................................. 1117720.1

(51) Int. Cl.
*G06F 17/10* (2006.01)
*G01G 19/08* (2006.01)
(Continued)

(52) U.S. Cl.
CPC ............. *G01G 19/086* (2013.01); *B60W 40/13* (2013.01); *F16H 61/425* (2013.01); *F16H 61/435* (2013.01); *F16H 61/472* (2013.01);
(Continued)

(58) Field of Classification Search
CPC .................................................... G01G 19/086

USPC ........................................... 701/124, 41, 117
See application file for complete search history.

(56) References Cited

U.S. PATENT DOCUMENTS 4,548,079 A    10/1985 Klatt
5,610,372 A *  3/1997 Phillips et al. ............. 177/25.14
(Continued)

FOREIGN PATENT DOCUMENTS

EP      0111636 A2    6/1984
EP      2341265 A1    7/2011

OTHER PUBLICATIONS

International Search Report for International Application No. PCT/EP2012/067976 dated Sep. 13, 2012.

*Primary Examiner* — Thomas G Black
*Assistant Examiner* — Luke Huynh

(57) ABSTRACT

A system is provided for determining the current weight of a vehicle and any implement or trailer being towed or carried thereby. The system has an electronic control unit and means to determine the current value of vehicle operating parameters indicative of the current wheel output torque and acceleration of the vehicle. These current parameter values are forwarded to the electronic control unit so that the unit can calculate the current vehicle weight from a predetermined relationship involving wheel output torque, vehicle acceleration and other known current operating parameters of the vehicle. The other known current operating parameters of the vehicle are wheel rolling radius, angle of inclination of the vehicle, gravitational acceleration and rolling resistance of the wheels. When the vehicle includes a hydrostatic mechanical CVT which has a hydraulic drive circuit in which a hydraulic pump supplies pressurized fluid to a hydraulic motor, the level of pressure in the drive circuit provides an indication of the current wheel output torque.

15 Claims, 3 Drawing Sheets

(51) Int. Cl.
*B60W 40/13* (2012.01)
*F16H 61/425* (2010.01)
*F16H 61/435* (2010.01)
*F16H 61/472* (2010.01)
*F16H 47/04* (2006.01)
*F16H 37/08* (2006.01)

(52) U.S. Cl.
CPC .. *B60W2510/1085* (2013.01); *B60W 2520/105* (2013.01); *B60W 2520/30* (2013.01); *B60W 2530/16* (2013.01); *B60W 2530/20* (2013.01); *B60W 2550/142* (2013.01); *B60Y 2200/221* (2013.01); *B60Y 2300/28* (2013.01); *B60Y 2400/72* (2013.01); *F16H 47/04* (2013.01); *F16H 2037/0866* (2013.01)

(56) References Cited

U.S. PATENT DOCUMENTS

| | | | |
|---|---|---|---|
| 6,446,024 B1 * | 9/2002 | Leimbach et al. | 702/141 |
| 2011/0166752 A1 | 7/2011 | Dix et al. | |
| 2013/0041561 A1 * | 2/2013 | Asami et al. | 701/50 |

* cited by examiner

METHOD TO DETERMINE VEHICLE WEIGHT

The invention relates to a method to determine weight of vehicles such as agricultural or utility tractors equipped with a Continuously Variable Transmission (CVT).

BACKGROUND/PRIOR ART

The weight of a vehicle influences several functions of the vehicle. Safety and assistance systems like ABS or ESP may be optimised by accurate knowledge of the vehicle weight. For example, anti-skid systems control brake actuation so that the wheels of the vehicle do not lock by releasing the brake when locking is detected. Thereby control strategy is improved by proactively monitor several parameters to optimise the brake actuation. Beside several other parameters like wheel to ground contact condition, the tendency for the wheels to lock depends on the vehicle weight which has to be decelerated so that an accurate knowledge of the current vehicle weight helps to improve the anti-skid strategy. This improves safety and reduces wear on the brakes and wheel tyres.

The vehicle weight is especially important for vehicles which may vary significantly in weight due to changing payload such as trucks and agricultural vehicles. In such vehicles weight may vary from 15 tons when empty to 40 tons when full loaded so that the weight may vary by about 300%. As described above, this is an important parameter to improve the control quality of anti-skid systems.

The prior art shows different procedures to determine vehicle weight which are discussed briefly below.

U.S. Pat. No. 6,526,334 describes a system in which the vehicle weight is determined by measuring wheel load on the respective wheels. The detailed procedure is not described but it is well known to use, e.g. tyre pressure or tyre deformation as an indication of vehicle weight. The procedure is costly as sensors must be installed solely for this purpose. In addition, this procedure must be seen as insufficient as a combination of a pulling vehicle and a trailer can only be controlled using this procedure if the trailer is also equipped with such costly sensors. This is not cost-efficient, as many different trailers are used especially in combination with tractors.

U.S. Pat. No. 5,938,295 describes a system in which the vehicle weight is determined by measuring wheel load by pressure sensors in the suspension system. Similarly to U.S. Pat. No. 6,526,334 the procedure requires sensors also in the trailer. In addition, not every tractor is equipped with suspension systems on the front, or even more rarely on the rear axle, so again, additional sensors must be installed increasing vehicle costs.

Trucks mainly determine vehicle weight by including torque of the combustion engine in combination with force impact during shifting.

U.S. Pat. No. 4,548,079 (EP 111 636) describes a procedure in which the torque of the combustion engine is combined with an acceleration sensor whereby rolling resistance and air resistance is included. The engine torque thereby delivers a value to calculate the pull force to drive and accelerate the vehicle. In addition, performance requirements of secondary drives, e.g. HVAC compressor or air compressor are included by using characteristic maps.

This procedure mitigates some of the problems mentioned above, especially the fact that trailers can be included into the calculation without requiring additional sensors. But on the other hand this procedure is only adequate for vehicles in which the engine torque is mainly transferred in driving performance and the influence of secondary drives, eg. HVAC compressor or generators are minor. This is especially correct for trucks in which secondary drives require very low performance or a performance which is known or easy to calculate in every operating condition.

Especially in agricultural vehicles, e.g. tractors, the influence of secondary drives is much higher as driving over ground is just a secondary purpose in some operations. Especially hydraulic supply systems need high performance which cannot be determined in every operating situation especially as trailers/implements are supplied.

So, considering engine torque as a major parameter to determine vehicle weight is not suitable for vehicles like agricultural tractors.

SUMMARY OF THE INVENTION

It is an object of the present invention to provide a procedure to determine the weight of vehicles which is particularly suitable for use on an agricultural tractor.

Thus according to the present invention there is provided a system for determining the current weight of a vehicle and any implement or trailer being towed or carried thereby, the system comprising an electronic control unit, means to determine the current value of vehicle operating parameters indicative of the current wheel output torque and acceleration of the vehicle, said current parameter values being forwarded to the electronic control unit so that the unit can calculate the current vehicle weight from a predetermined relationship involving wheel output torque, vehicle acceleration and other known current operating parameters of the vehicle, wherein the vehicle includes a CVT which has a hydraulic drive circuit fully or partly transmitting torque to vehicle wheels in which a hydraulic pump supplies pressurised fluid to a hydraulic motor, the level of pressure in the drive circuit providing an indication of the current wheel output torque.

The other known current operating parameters of the vehicle may be wheel rolling radius, angle of inclination of the vehicle, gravitational acceleration and rolling resistance of the wheels.

Such systems by their use of parameters of the transmission eliminate the influence of secondary drives since the torque output of the transmission is not reduced by variable secondary drive performance requirements so that the torque used to propel the vehicle provides an accurate determination of the weight of the vehicle.

Also, as the system is used on a vehicle with a CVT, since a sensor is already provided to measure this motor circuit pressure, no additional sensors are needed. The system also automatically takes account of the weight of any implement or trailer being drawn by the tractor without the need for additional sensors.

Other parameters beside those delivered by the transmission which are already installed for safety and assistance systems (ABS, ESP or GPS) or can also be utilised at very low costs.

Other inventive features of the present invention are set out in the accompanying dependent claims.

The present invention will now be described, by way of example only, with reference to the accompanying drawings in which:—

FIG. 1 diagrammatically shows a driveline of a tractor with a hydrostatic mechanical CVT and having a weight measurement system in accordance with the present invention;

FIG. 2 diagrammatically shows in more detail the hydrostatic mechanical CVT portion of the driveline of FIG. 1;

Figure 1:
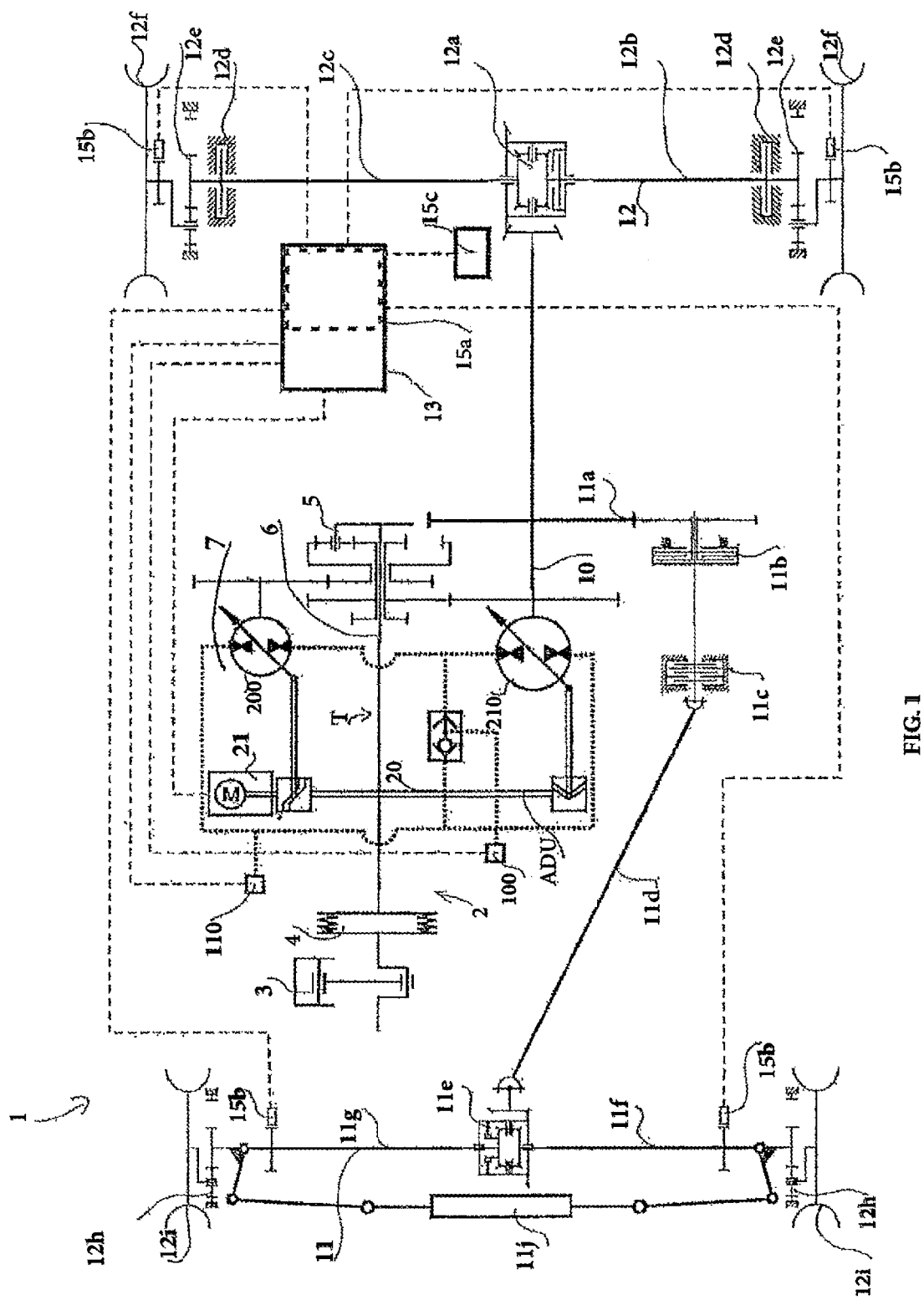

Referring to the drawings, a tractor 1 has a driveline 2 having a combustion engine 3, a flywheel 4, a continuously variable transmission (CVT) T of the hydrostatic-mechanical split type driving front and rear axles 11 and 12.

A tractor control unit 13 is provided to control various functions of the vehicle. The control unit 13 is electronically connected to various components via CAN-BUS, e.g. transmission, display and input devices. The control unit 13 also contains software to drive various electronic control systems such as the hitch control and braking systems. The control unit 13 is connected to a display device (not shown) in the tractor cab to receive input from the operator and show information to the operator.

Figure 2:
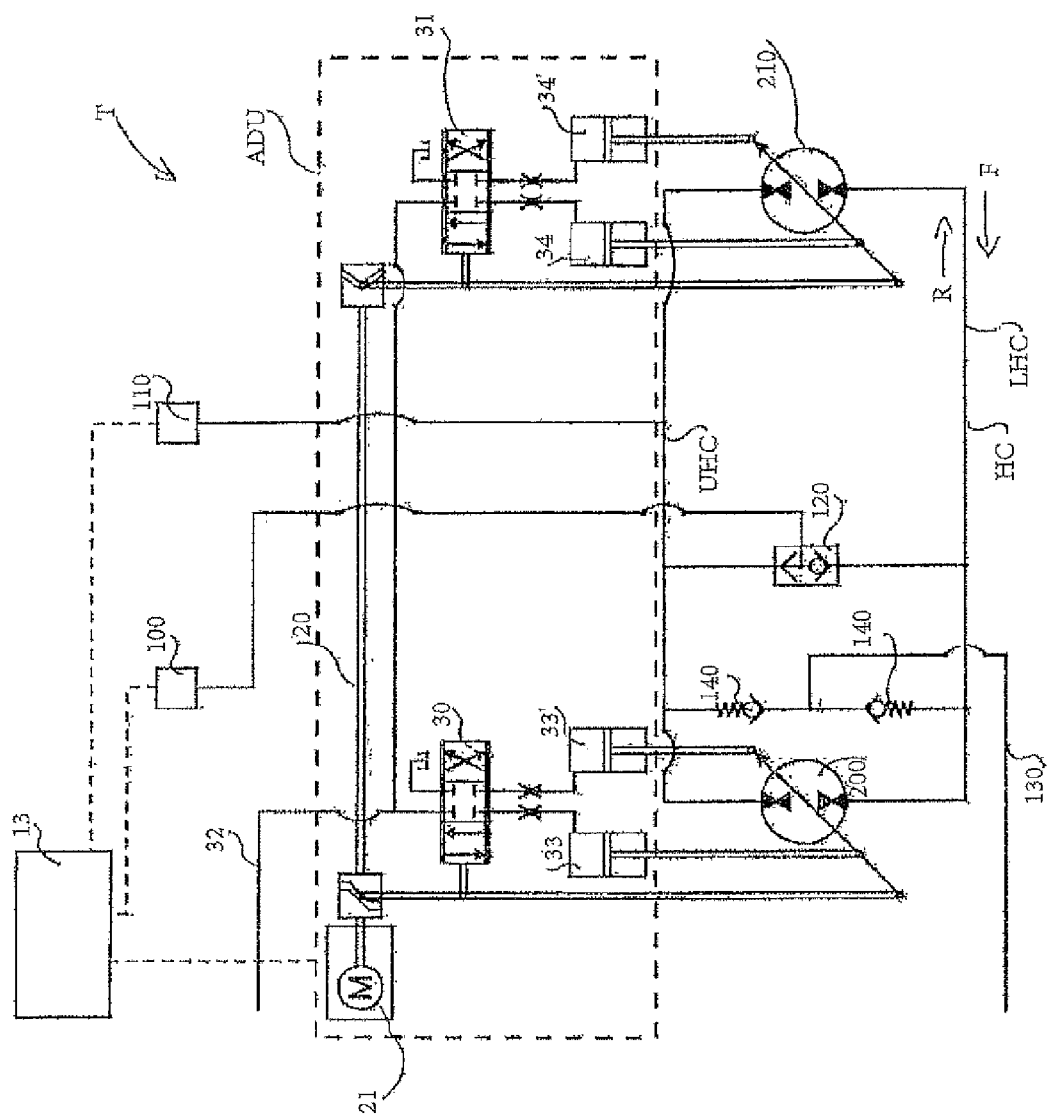

FIG. 2 shows the driveline 2 of the tractor 1 in more detail. The torque supplied by combustion engine 3 via a flywheel 4 is distributed to a mechanic branch 6 and a hydrostatic branch 7 of the transmission T via planetary drive 5. The hydrostatic branch 7 mainly consists of hydrostats 200, 210, wherein hereafter the hydrostat 200 is designated as the hydraulic pump 200 and the hydrostat 210 as the hydraulic motor 210. Both hydraulic pump 200 and hydraulic motor 210 can be pivoted by an adjustment unit ADU to change delivery/intake volume as described in FIG. 2.

Both mechanic branch 6 and hydrostatic branch 7 of the transmission are drivingly brought together on a CVT output shaft 10 at the end of CVT T. The CVT output shaft 10 delivers an output torque to the respective driveline front and rear axles 11 and 12.

CVT output shaft 10 drives a rear axle differential 12a splitting the torque to a left rear axle portion 12b and a right rear axle portion 12c. Both rear axles portion 12b, 12c are provided with brakes 12d, final reduction gears 12e and wheels 12f.

CVT output shaft 10 also drives a front axle drive gear pair 11a followed by a front wheel drive clutch 11b to disengage and engage front axle driveline. In addition a front brake 11c is provided connected to a cardan shaft 11d which ends in a front axle differential 11e splitting the torque to a left front axle portion 11f and a right front axle portion 11g. Both front axles portions 11f, 11g are provided with final reduction gears 12h and wheels 12i. Wheels 12i are steerable about substantially vertical axis using a hydraulic steering cylinder 11j mounted on the front axle.

The driveline 2 is also equipped with a anti-skid system 15 which mainly consists of a anti-skid control unit 15a integrated in the tractor control unit 13 of the tractor 1, speed sensors 15b for each wheels 12i, 12f and an further anti-skid sensor 15c. The anti-skid sensor 15c provides relevant parameters to control brake function, e.g. acceleration in various axis or inclination of the vehicle, anti-skid control unit 15a may be separate from tractor control unit 13.

Alternatively, a GPS system may also deliver parameters like the acceleration or the inclination of the vehicle.

FIG. 2 shows a diagrammatic sketch of the hydrostatic mechanical split type transmission T having an adjustment unit ADU defined by the broken line. The components outside the broken line belong to the power unit of the transmission. The hydrostats 200, 210 illustrated in FIG. 2 are an axial piston pump and an axial piston motor of oblique-axle design, of which the delivery/intake volume is changed by the pivoting of the axis of rotation of the pistons to an axle drive shaft, not shown. By means of a first valve unit 30 allocated to hydraulic pump 200, and by means of a second valve unit 31 allocated to the hydraulic motor 210, the individual pivot angle of the hydraulic pump 200 and/or of the hydraulic motor 210 can be adjusted.

Depending on the specified revolution speed transmission ratio iT set by the driver via control unit 13 an actuator element 20 is rotated by means of an actuator motor 21. The actuator motor 21 is in this case controlled by a control unit 13. Because the valve units 30, 31 are coupled to the actuator element 20, these valve units 30, 31 are displaced corresponding to the actuator element 20. As a result, oil present in a line 32 can flow into a cylinder 33, 33', 34, 34' allocated to the valve unit 30, 31.

Due to the displacement of the actuator element 20, the oil flow is accordingly directed out of the line 32 into the cylinders 33, 33', 34, 34' and so pivot angle of the hydraulic pump 200 and of the hydraulic motor 210 is adjusted. The pivot angle, and therefore the delivery volume of the hydraulic pump 200 and the intake volume of the hydraulic motor 210 can accordingly be changed. This makes it possible for the revolution speed of the axle drive shaft, not shown in FIG. 3, to be adjusted, and with it the revolution speed transmission ratio of the transmission T.

The hydraulic pump 200 is connected by fluid circuit HC to the hydraulic motor 210. The fluid circuit HC in has an upper circuit UHC and a lower circuit LHC. The direction of the arrow F represents a flow direction of the fluid located inside the hydraulic circuit HC during forwards travel of the tractor and the direction of the arrow R represents a flow direction of the fluid during reverse travel of the tractor.

By means of a first measuring unit 110, the pressure value pUHC prevailing in the upper circuit UHC can be measured. This pressure value pUHC is then sent to the control unit 13 represented in FIG. 1. Moreover, both the pressure in the upper circuit UHC as well as the pressure in the lower circuit LHC is conducted by means of a shuttle valve 120 to a second measuring unit 100 in order to measure the pressure value pHCmax. This pressure value pHCmax is also sent to the control unit 13.

Thereby the shuttle valve in the transmission T is designed in such a way so as to communicate to the second measuring unit 100 the greater of the two pressures present in the upper circuit UHC or of the lower circuit LHC as a pressure value pHCmax. When the utility vehicle is stationary, the second measuring unit 100 issues a system pressure arising in the upper circuit UHC or the lower circuit LHC as pressure value pHCmax. A rotation sensor, not visible in FIG. 2, is arranged at the hydraulic motor 210, with which the direction of the rotation of the hydraulic motor 210 is determined and the direction of travel of the vehicle can be concluded.

Preferably, when the vehicle is stationary a system pressure of about 15 bar is set in the fluid circuit HC. This system pressure of 15 bar results from the fact that, by means of a supply line 130, the fluid circuit HC is supplied with a constant system pressure by means of a constant hydraulic pump, not shown, driven by the combustion engine. Two check valves 140 prevent oil from flowing back into the supply line. As soon as the utility vehicle moves or the transmission is no longer stationary, the pressure inside the fluid circuit rises, depending on the drive torque, to a high-pressure value of over 15 bar. With an average loading of the transmission, a high-pressure value of 250-350 bar is provided. A limit value of 500 bar must not be exceeded in order to avoid overstressing of the transmission and its components.

Pressure pHCmax, transmission ratio iT or alternatively the pivot angle of the hydraulic motor 210 or alternatively the intake volume V of the hydraulic motor 210 represent parameters which determine the output torque Mhydr of the hydraulic branch 7. As the transmission ratio iT is known, the other parameters pivot angle and intake volume of the hydraulic motor 210 are can be determined by look-up tables or characteristic maps.

As described in relation to FIG. 1, the torque supplied by combustion engine 3 is distributed to a mechanic branch 6 and a hydrostatic branch 7 of the hydrostatic mechanical split type transmission T in which the fraction of torque transmitted by both branches depends on the transmission ratio iT. So if the fraction of the hydrostatic branch 7 is determined as described above, the fraction Mmech transmitted by the mechanic branch 6 can also be determined depending on the current transmission ratio iT.

The overall output torque MOT of the transmission can then be calculated from $$MOT = Mhydr + Mmech = \frac{pHCmax * V}{2\pi} + Mmech \qquad (1)$$

The pressure pHCmax is measured as described above and the intake volume V of the hydraulic motor 210 is determined by characteristic maps depending on the transmission ratio iT.

The output torque MOT of the transmission is supplied to the wheels resulting in a wheel torque MW:

$$MW = MOT * iTW \qquad (2)$$

In this equation iTW represents the overall gear ratio between transmission and wheel being the product of the gear ratio of the rear axle differential 12a and the final reduction gears 12e, e.g.:
ITW=9.2 (for the rear axle differential 12a)×3.58 (for the final reduction gears 12e)=32.97 overall.

Figure 3A:
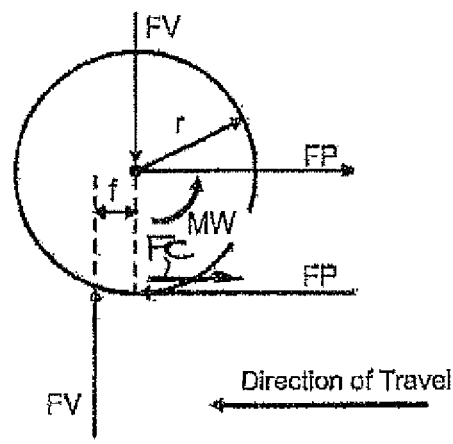
FIG. 3a shows a diagram of the forces between a tractor wheel and ground.

Having the wheel torque MW, the pull force FP can be calculated by using the known relation ship of the forces on a wheel as shown in the diagram in FIG. 3a.

$$MW = FP*r + FV*f = FC*r \qquad (3)$$

In which:
r represents the effective wheel radius depending on tyre pressure and wheel size provided by the wheel manufacturer in respective tables
f represents the offset of the point of application of the wheel vertical force (see FIG. 3a) caused by Roll resistance and sinking of the wheels The circumferential force FC is a theoretical value achieved by converting equation (3):

$$FC = \frac{MW}{r} = FP + FV * \frac{f}{r} \qquad (4)$$

The coefficient f/r is known as roll resistance factor ρ.

$$\rho = \frac{f}{r} \qquad (5)$$

Figure 3B:
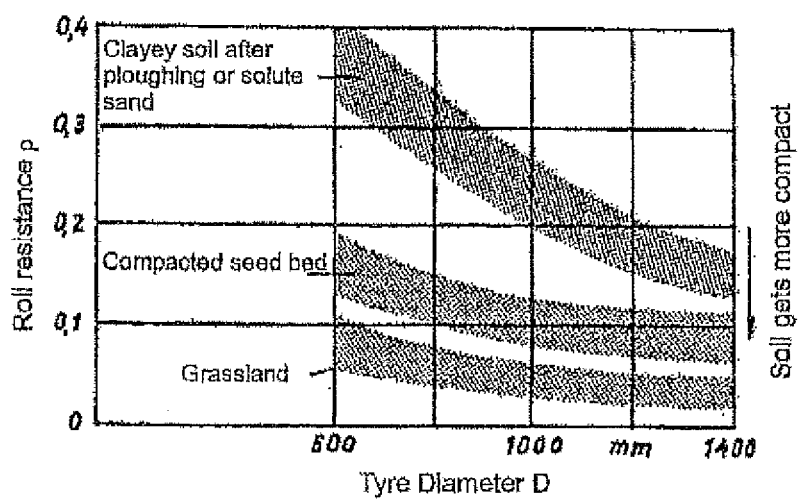
FIG. 3b shows a characteristic map of the relationship between roll resistance, tyre diameter and soil condition.

This coefficient is a value representing the sinking of the wheel into the soil and the friction between the tyre contact areas and the soil and mainly depends on tyre size and soil condition as shown in FIG. 3b.

Inserting (5) into (4) results in the equation for circumferential force FC:

$$FC = \frac{MW}{r} = FP + FV * \rho \qquad (6)$$

Pull force FP is the horizontal force applied to the tractor and can be divided into several fractions when the vehicle is constantly accelerated.

$$FP = FINC + FA \qquad (7)$$

In which:
FINC represents the fraction of the force needed to climb uphill. If the force is negative vehicle is going downhill
FA is the fraction of the force needed to constantly accelerate the vehicle
Inserting (7) into (6):

$$FC = \frac{MW}{r} = FINC + FA + FV * \rho \qquad (8)$$

Solving equation (8) to determine weight/mass m of the vehicle:

$$FC = \frac{MW}{r} = m*g*\sin\alpha + m*a + m*g*\rho \qquad (9)$$

So the weight/mass m of the vehicle is:

$$m = \frac{MW}{r(g*\sin\alpha + a + g*\rho)} \qquad (10)$$

The acceleration can directly be measured by means of the anti-skid sensor 15c or indirectly by measuring distance/speed over ground via GPS or radar sensors:

$$a = \frac{v_2 - v_1}{t_2 - t_1} = \frac{\Delta v}{\Delta t} \qquad (12)$$

The inclination angle α can also be determined by sensors on the vehicle as this parameter is used in anti-skid systems or GPS/GNNS navigation.

Roll resistance factor ρ depends on soil condition and wheel diameter/radius and varies in between 0.015 (for asphalt or concrete roads) and 0.4 (for wet and soaked soil) according literature and the table shown in FIG. 3b.

If the measuring cycle with constant acceleration is carried out at relatively high speed over ground, it is likely that the tractor drives on hard ground like a public asphalt road or a country lane with hard ground. Due to this assumption, roll resistance factor ρ is considered to be about 0.02. For high speed over ground the variation of this assumption may be very small, e.g. a real value of 0.015 would result in a variation of 0.5 percent which is an acceptable accuracy. As the absolute value of roll resistance factor ρ is very small on hard ground, parts of the equations related to roll resistance may be left out for determination of the vehicle weight without massively worsening accuracy.

If there is no sensor to determine inclination angle α an alternative procedure is suggested:

Multiple measuring cycles are carried out with constant acceleration with the assumption that during the cycles, uphill, downhill and flat ground driving is done and that by taking the average of these cycles, the influence of uphill or downhill driving are balanced resulting in a value representing driving on flat ground.

Furthermore the weight of the vehicle can be determined in a short-term and/or long-term manner:
The short-term value is less accurate, due for example to uphill or downhill driving without this uphill/downhill driving being determined by inclination sensors. This value may result in that high oscillations occurring in control systems using vehicle weight. Therefore short-term values should only considered for control functions related to comfort but not for safety relevant functions.

The long-term value is more accurate as several measuring cycle are provided which are compared and checked by means of other parameters. These values should be used for safety relevant functions.

Compared to the procedure known in prior art, the invention described above offers an improved determination of the vehicle weight as influence of secondary drives is eliminated.

Using the present invention an adequate accuracy can be provided to several sub systems of the vehicle requiring vehicle weight.

For example:—
Improved anti-skid and stability control systems can be provided as the vehicle weight is more accurately known.

The suspension systems for wheel axles can be optimised.

Improved control of CVT control functions. E.g. the acceleration ramp (the degree of acceleration of the vehicle can be adjusted in 4 degrees (1 for low acceleration . . . 4 for high acceleration). Nowadays, the ramps is not considering vehicle weight so a heavier vehicle accelerates less than a lighter vehicle using the same ramp value. By knowing vehicle weight this ramp could represent a realistic value;

Systems for fuel consumption reduction could be optimized. If the vehicle is very light, engine speed can be reduced much more then when vehicle is heavier while having the same power reserves.

Trailer brakes could be in a more proportionate manner according the weight of the trailer.

The suspension/damping systems for implement linkage control systems when the linkage and associated implement are being carried in the transport position over rough ground can be optimised. The relation between vehicle weight and load applied to the linkage system enables a better matching of damping characteristics.

In a further embodiment, the measured values of vehicle weight are checked. As the vehicle weight can be determined very exactly after production of the vehicle the measured values can be compared with this default value.

In a further embodiment the plausibility check could be extended to an assumption as to whether a trailer/implement is attached or not. If the default value is massively exceeded, a trailer may be attached. By additionally checking the electric trailer connector or hydraulic connectors the system may be able to identify trailer operation. Furthermore, the driver could enter additional weights (on the wheels or front or rear linkage) attached to the tractor into the control system to adapt the default setting of the tractor weight.

In addition the weight of an unloaded trailer could be entered into the system so that to calculate the payload on a trailer the default value is corrected by additional weights and/or the default value of the empty trailer.

Instead of the driver entering additional weight or trailer/implement weights, these weights may be transferred to the control system via ISOBUS or RFID to avoid faulty insertion. Alternatively, this information may be stored in the control unit and automatically selected when additional weight or trailer/implements are attached by RFID or connector recognition (e.g. via ISOBUS).

To further improve accuracy, losses and efficiency of the components can be considered:
1. Driveline Efficiency
    The efficiency of the hydraulic motor 210 could be inserted in equation (1)

In addition efficiency between the transmission and the wheels can be considered in equation (2) by respective characteristic maps.

The efficiency values may be determined empirically and saved in characteristic maps or as parameters.

2. Efficiency Values can be Determined by Current Vehicle Data

Transmission efficiency may be determined by considering current transmission oil temperature. The relation between temperature and efficiency is provided by characteristic maps.

The efficiency of the wheels can be determined by measuring rotational speed of the axles/wheels by using speed sensors 15b of the Anti-skid system 15. As preferably, the front wheels are not driven during measurement, the front axle speed represent the current real speed while the driven rear axle may operate with slip. The quotient of both speeds for front axle (nFA) and rear axle (nRA) provides the efficiency of the driven wheels presuming that all wheels of an axle rotate with same speed:

$$\eta = \frac{nFA}{nRA}$$

3. Contact Conditions Between Soil and Wheel can be Determined

An important factor for the calculation of pull forces is the effective wheel diameter/radius (see equation (3)) which is considered as constant for the first step. For further improvement, the effective wheel diameter/radius could be saved in characteristic maps depending on wheel load and tyre pressure whereby:

The wheel load could be determined by measuring pressure in a hydraulic cylinder of the front axle suspension or strain gauges in the rigid rear axle housing.

The tyre pressure is known if the vehicle is equipped with a tyre pressure control system.

The characteristic map defining relationship between tyre size, tyre pressure and wheel load and may be supplied by the tyre manufacturers.

4. Attachment Points and Loads can be Determined

By using simple sensors like pressure sensor in respective hydraulic cylinders of rear or front linkage or an attached front loader, loads applied to the linkage or front loader can be measured and the vehicle weights determined by above described procedures can be checked. E.g. if the rear linkage determines the weight of an implement attached thereto by use of said pressure sensors in the linkage cylinder, the system may check whether the determined overall weight is correct as the sum of the default value (vehicle weight without implement attached) and the measured weight of the implement must equate to the overall weight.

5. Wheel Load Measurement

Furthermore, if the vehicle is equipped with sensors as described in point 3 above to measure wheel load, this value may also be taken to check the determined vehicle weight.

Furthermore, in the procedures described above, the determination of the vehicle weight is checked by additional parameters. Vice versa, the determined vehicle weight could be used to check other weight determining means as described in point 4 and 5.

The invention claimed is:

1. A system for determining a current weight of a vehicle and any implement or trailer being towed or carried thereby, the system comprising an electronic control unit to determine a current value of vehicle operating parameters indicative of a current wheel output torque and acceleration of the vehicle, said current parameter values being forwarded to the electronic control unit so that the unit can calculate the current vehicle weight from a predetermined relationship involving wheel output torque, vehicle acceleration and other known current operating parameters of the vehicle, wherein the vehicle includes a continuously variable transmission (CVT) which has a hydraulic drive circuit fully or partly transmitting torque to vehicle wheels in which a hydraulic pump supplies pressurized fluid to a hydraulic motor, the level of pressure in the drive circuit providing an indication of the current wheel output torque, and wherein the CVT is a hydrostatic mechanical split CVT has a mechanic and an hydrostatic branch to supply torque to the vehicle wheels.

2. A system according to claim 1 in which the other known current operating parameters of the vehicle are at least one of wheel rolling radius, angle of inclination of the vehicle, gravitational acceleration, and rolling resistance of the wheels.

3. A system according to claim 1, for use with a vehicle towing a braked trailer in which the total weight of the trailer is determined by the system and braking characteristics of the trailer are adjusted according to the trailer weight.

4. A system according to claim 1, in which other operating parameters of the transmission are used in determining the wheel output torque.

5. A system according to claim 4 in which at least one of the pivot angle of the motor, the pivot angle of the pump, and the intake volume of an hydraulic motor are used in determining wheel output torque.

6. A system according to claim 1, in which the acceleration of the vehicle is determined by an acceleration sensor, global navigation satellite system (GNSS) system or radar sensor.

7. A system according to claim 1, in which an effective wheel rolling radius is determined by a characteristic map in dependency of wheel load and tyre pressure.

8. A system according to claim 1, for use with a vehicle towing a trailer in which the weight of the empty trailer is manually or automatically entered into the electronic control unit and the system can determine the current total weight of the trailer so that the load of the trailer can be calculated.

9. A system according to claim 3 in which the existence of electrical or hydraulic connections to the trailer are checked to confirm that a trailer is being towed.

10. A system according to claim 7 in which the existence of electrical or hydraulic connections to the trailer are checked to confirm that a trailer is being towed.

11. A system according to claim 1 in which the efficiency of the transmission is taken into account.

12. A system according to claim 1 in which the efficiency of the wheel to ground contact is taken into account.

13. A system according claim 1 in which the determined vehicle weight with implement or trailer is checked by adding to the known weight of the vehicle without an implement or trailer attached the weight of the implement or trailer determined from pressure sensors provided in at least one of rear or front linkages and front loaders in use on the vehicle.

14. A system according claim 1 in which the determined vehicle weight with implement or trailer is checked by comparing the determined weight with the weight indicated by pressure sensors in hydraulic cylinders of a hydraulic axle suspension of the vehicle or determined by strain gauges attached to a rigid axle housing of the vehicle.

15. A system according claim 1 in which the determined weight of any implement or trailer being towed or carried by the vehicle is checked by comparing the known weight of the vehicle without the weight of the implement or trailer with the determined weight of the vehicle with the implement or trailer.

* * * * *